(12) United States Patent
Ahn et al.

(10) Patent No.: US 11,825,234 B2
(45) Date of Patent: Nov. 21, 2023

(54) IMAGE PROCESSING APPARATUS AND OPERATION METHOD THEREOF

(71) Applicant: SAMSUNG ELECTRONICS CO., LTD., Suwon-si (KR)

(72) Inventors: Iljun Ahn, Suwon-si (KR); Yongsup Park, Suwon-si (KR); Jaeyeon Park, Suwon-si (KR); Tammy Lee, Suwon-si (KR); Minsu Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 231 days.

(21) Appl. No.: 17/256,560

(22) PCT Filed: Jul. 16, 2019

(86) PCT No.: PCT/KR2019/008779
§ 371 (c)(1),
(2) Date: Dec. 28, 2020

(87) PCT Pub. No.: WO2020/017871
PCT Pub. Date: Jan. 23, 2020

(65) Prior Publication Data
US 2021/0224951 A1    Jul. 22, 2021

(30) Foreign Application Priority Data
Jul. 16, 2018 (KR) ........................ 10-2018-0082375

(51) Int. Cl.
*H04N 7/01* (2006.01)
*G06N 3/08* (2023.01)
(Continued)

(52) U.S. Cl.
CPC .......... *H04N 7/0117* (2013.01); *G06F 18/22* (2023.01); *G06N 3/045* (2023.01); *G06N 3/08* (2013.01);
(Continued)

(58) Field of Classification Search
CPC .. H04N 7/0117; H04N 7/0127; H04N 7/0132; G06F 18/22; G06N 3/045;
(Continued)

(56) References Cited

U.S. PATENT DOCUMENTS

| 5,376,963 A | 12/1994 | Zortea |
| 10,268,947 B2 | 4/2019 | Wang et al. |

(Continued)

FOREIGN PATENT DOCUMENTS

| CN | 107464217 A | 12/2017 |
| CN | 108022212 A | 5/2018 |

(Continued)

OTHER PUBLICATIONS

Huang, Yan, Wei Wang, and Liang Wang. "Bidirectional recurrent convolutional networks for multi-frame super-resolution." Advances in neural information processing systems 28 (2015). (Year: 2015).*

(Continued)

*Primary Examiner* — Andrae S Allison
(74) *Attorney, Agent, or Firm* — Sughrue Mion, PLLC

(57) ABSTRACT

Provided is an image processing apparatus for generating a high-resolution image. The image processing apparatus includes a memory storing one or more instructions and a processor configured to execute the one or more instructions stored in the memory, wherein the processor is configured to extract feature information regarding a low-resolution image of a current frame by using a first convolutional neural network, generate, based on the feature information, a first high-resolution image of the current frame, remove flickering of the first high-resolution image by using a high-resolution image of a previous frame, and remove flickering of a high-resolution image of a next frame by using at least one of a flickering-removed second high-resolution image of the current frame, or the feature information.

14 Claims, 13 Drawing Sheets

(51) Int. Cl.
  *G06T 3/40* (2006.01)
  *G06T 5/00* (2006.01)
  *G06F 18/22* (2023.01)
  *G06N 3/045* (2023.01)

(52) U.S. Cl.
  CPC .......... *G06T 3/4007* (2013.01); *G06T 3/4046* (2013.01); *G06T 5/002* (2013.01); *G06T 2207/10016* (2013.01); *G06T 2207/20084* (2013.01); *G06T 2207/20182* (2013.01)

(58) Field of Classification Search
  CPC . G06N 3/08; G06N 3/084; G06N 3/04; G06T 3/4007; G06T 3/4046; G06T 5/002; G06T 2207/10016; G06T 2207/20084; G06T 2207/20182; G06T 3/4053; G06T 5/50; G09G 2320/0247; G09G 2340/0407; G09G 2340/14; G09G 2370/08; G09G 5/003
  See application file for complete search history.

(56) References Cited

U.S. PATENT DOCUMENTS

| | | | |
|---|---|---|---|
| 10,319,075 | B2 | 6/2019 | Kothule et al. |
| 10,681,361 | B2* | 6/2020 | Wang .................. H04N 19/33 |
| 11,373,275 | B2 | 6/2022 | Tai et al. |
| 2016/0337571 | A1* | 11/2016 | Suzuki ................ H04N 23/745 |
| 2017/0132760 | A1 | 5/2017 | Kothule et al. |
| 2018/0082715 | A1* | 3/2018 | Rymkowski ........... G06V 20/10 |
| 2018/0130178 | A1 | 5/2018 | Wang et al. |
| 2018/0211371 | A1* | 7/2018 | Liu ....................... H04N 9/646 |
| 2019/0096038 | A1* | 3/2019 | El-Khamy ............. G06N 3/045 |
| 2019/0370936 | A1* | 12/2019 | Zhang ..................... G06T 3/40 |
| 2021/0357651 | A1* | 11/2021 | Fan ...................... G06V 10/454 |
| 2022/0327692 | A1* | 10/2022 | Park ........................ G06T 5/002 |

FOREIGN PATENT DOCUMENTS

| | | |
|---|---|---|
| JP | 2016-19139 A | 2/2016 |
| KR | 10-2017-0047489 A | 5/2017 |
| KR | 10-2017-0058277 A | 5/2017 |
| KR | 10-2017-0077621 A | 7/2017 |
| KR | 10-1780057 B1 | 9/2017 |
| KR | 10-2018-0062422 A | 6/2018 |

OTHER PUBLICATIONS

Lai, Wei-Sheng, et al. "Learning blind video temporal consistency." Proceedings of the European conference on computer vision (ECCV). 2018. (Year: 2018).*
D. Li and Z. Wang, "Video Superresolution via Motion Compensation and Deep Residual Learning," in IEEE Transactions on Computational Imaging, vol. 3, No. 4, pp. 749-762, Dec. 2017, doi: 10.1109/TCI.2017.2671360. (Year: 2017).*
Communication dated Sep. 29, 2021 issued by the Intellectual Property India in Indian Application No. 202047055430.
Communication dated May 28, 2021 issued by the European Patent Office in counterpart European Application No. 19838734.2.
International Search Report and Written Opinion dated Oct. 21, 2019 issued by the International Searching Authority in International Application No. PCT/KR2019/008779 (PCT/ISA/220, 210, 237).
Caballero et al., "Real-Time Video Super-Resolution with Spatio-Temporal Networks and Motion Compensation," Proceedings of the IEEE Conference on Computer Vision and Pattern Recognition (CVPR), 2017, pp. 4778-4787.
Kappeler et al., "Video Super-Resolution With Convolutional Neural Networks," IEEE Transactions on Computational Imaging, vol. 2, No. 2, Jun. 2016, pp. 109-122.
Communication dated Mar. 30, 2023, issued by China National Intellectual Property Administration in Chinese Patent Application No. 201980047752.4.
Communication dated May 22, 2023, issued by Korean Intellectual Property Office in Korean Patent Application No. 10-2018-0082375.
Communication dated May 9, 2023, issued by European Patent Office in European Patent Application No. 19838734.2.
Communication dated Jan. 1, 2023, issued by the Korean Intellectual Property Office in Korean Patent Application No. 10-2018-0082375.

* cited by examiner

IMAGE PROCESSING APPARATUS AND OPERATION METHOD THEREOF

TECHNICAL FIELD

Various embodiments relate to an image processing apparatus for generating a high-resolution moving image and an operation method of the image processing apparatus, and more particularly, to an image processing apparatus that removes flickering existing in a high-resolution image, and an operation method of the image processing apparatus.

BACKGROUND ART

When a high-resolution moving image is generated using low-resolution images, the problem of flickering occurs. Flickering is a phenomenon in which a pattern (or a texture) in an identical object included in a frame is not maintained constant, but jitters or flickers, depending on the frame. Such flickering may occur due to flickering inherent in low-resolution images or in the course of upsampling the low-resolution images to a high-resolution moving image.

Conventionally, interframe motion is estimated and compensated for to remove flickering when a high-resolution moving image is generated using low-resolution images. However, estimation and compensation of interframe motion are complicated and correct motion estimation is difficult to perform. Moreover, a high-resolution image generated in a current frame is not used in generation of a high-resolution image in a next frame, weakening correlation between frames included in a generated high-resolution moving image.

DESCRIPTION OF EMBODIMENTS

Solution to Problem

Various embodiments provide an image processing apparatus for generating a high-resolution image by using a convolutional neural network, removes flickering existing in the high-resolution image, and removes flickering in a high-resolution image of a next frame by using the generated high-resolution image of the current frame, and an operation method of the image processing apparatus.

Advantageous Effects of Disclosure

An image processing apparatus according to an embodiment may use a high-resolution image of a current frame to remove flickering of a high-resolution image of a next frame, thereby reinforcing correlation between frames.

The image processing apparatus according to an embodiment may also skip motion estimation and motion compensation between complicated and hard frames to remove flickering of an image.

The image processing apparatus according to an embodiment may also save memory by storing feature information instead of a generated high-resolution image.

BEST MODE

Figure 1:
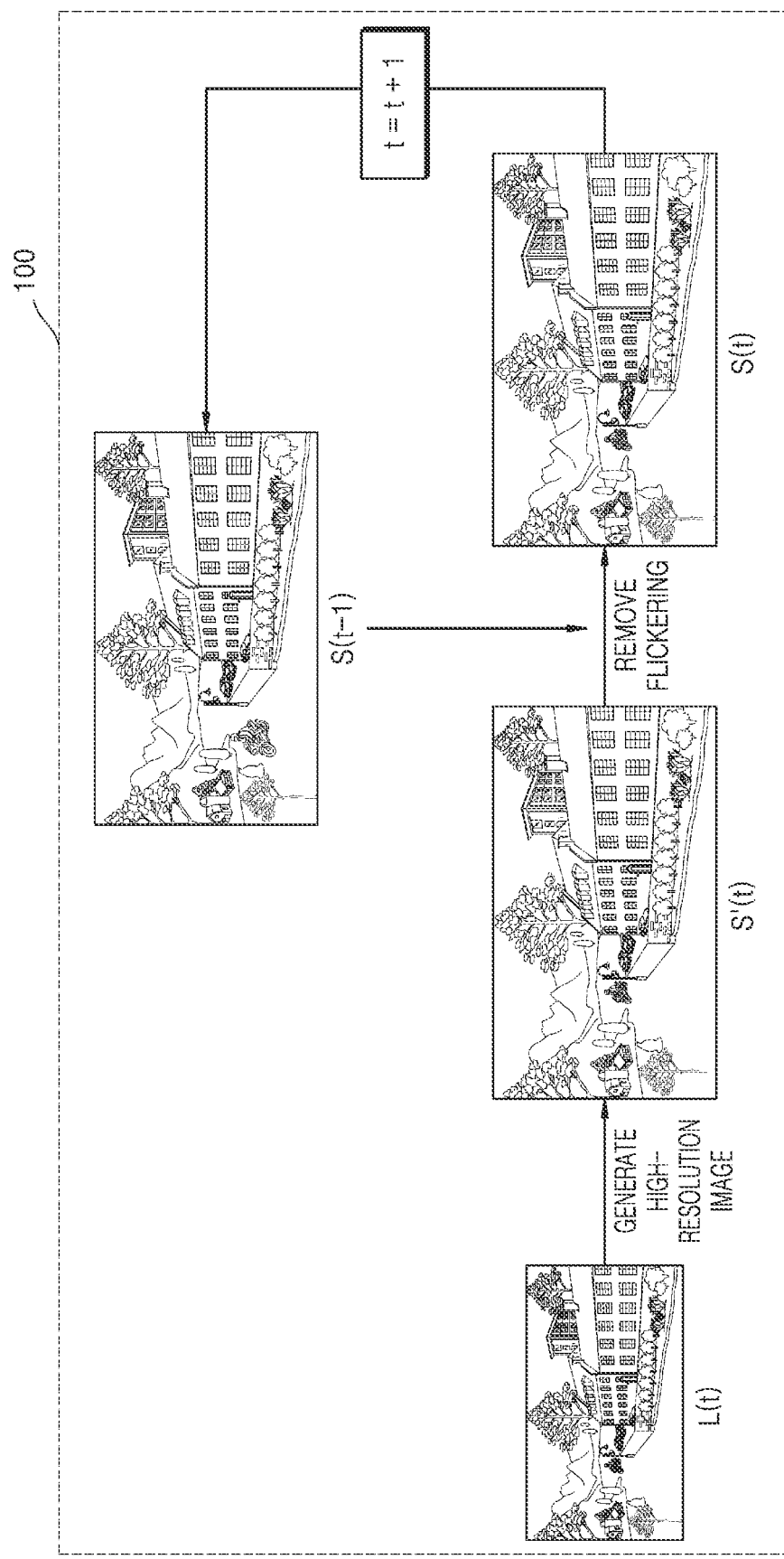
FIG. 1 illustrates a process, performed by an image processing apparatus, of generating a high-resolution moving image, according to an embodiment.

An image processing apparatus for generating a high-resolution image according to an embodiment includes a memory storing one or more instructions and a processor configured to execute the one or more instructions stored in the memory, in which the processor is configured to extract feature information regarding a low-resolution image of a current frame by using a first convolutional neural network, generate, based on the feature information, a first high-resolution image of the current frame, remove flickering of the first high-resolution image by using a high-resolution image of a previous frame, and remove flickering of a high-resolution image of a next frame by using at least one of a flickering-removed second high-resolution image of the current frame, or the feature information.

The first convolutional neural network according to an embodiment includes N convolution layers, and the processor is further configured to extract the feature information by inputting the low-resolution image of the current frame to the first convolutional neural network and performing a convolution operation with one or more kernels in each of the N convolution layers.

The processor according to an embodiment is further configured to generate the first high-resolution image by applying, to the feature information, at least one of a bilinear interpolation method, a bicubic interpolation method, or a convolutional interpolation method.

The processor according to an embodiment is further configured to remove flickering of the first high-resolution image by inputting the first high-resolution image of the current frame and the high-resolution image of the previous frame to the second convolutional neural network and performing a convolution operation with one or more kernels in each of the M convolution layers.

The processor according to an embodiment is further configured to extract first feature information corresponding to the second high-resolution image and second feature information corresponding to the actual high-resolution image of the current frame and update, based on the first feature information and the second feature information, at least one of the first convolutional neural network or the second convolutional neural network.

The processor according to an embodiment is further configured to adjust weight values of one or more kernels included in at least one of the first convolutional neural network or the second convolutional neural network.

The processor according to an embodiment is further configured to adjust weight values of one or more kernels included in the first convolutional neural network to reduce a difference between the first feature information and the second feature information.

The processor according to an embodiment is further configured to calculate a first difference between the first feature information and the second feature information and a second difference between third feature information corresponding to the generated high-resolution image of the previous frame and fourth feature information corresponding to an actual high-resolution image of the previous frame, and adjust weight values of one or more kernels included in the second convolutional neural network to reduce the difference between the first difference and the second difference.

The memory according to an embodiment may store at least one of the second high-resolution image or the feature information.

The processor according to an embodiment is further configured to generate the first high-resolution image based on feature information of the current frame stored in the memory and remove flickering of the high-resolution image of the next frame by using the first high-resolution image.

An operation method of an image processing apparatus for generating a high-resolution moving image according to an embodiment includes extracting feature information regarding a low-resolution image of a current frame by using a first convolutional neural network, generating a first high-resolution image of the current frame based on the feature information, removing flickering of the first high-resolution image by using a high-resolution image of a previous frame, and removing flickering of a high-resolution image of a next frame by using at least one of a flickering-removed second high-resolution image of the current frame, or the feature information.

A computer program product according to an embodiment includes one or more computer-readable recording media having stored therein a program for executing operations of extracting feature information regarding a low-resolution image of a current frame by using a first convolutional neural network, generating a first high-resolution image of the current frame based on the feature information, removing flickering of the first high-resolution image by using a high-resolution image of a previous frame, and removing flickering of a high-resolution image of a next frame by using at least one of a flickering-removed second high-resolution image of the current frame, or the feature information.

MODE OF DISCLOSURE

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, if it is assumed that a certain part includes a certain component, the term 'including' means that a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

FIG. 1 illustrates a process, performed by an image processing apparatus, of generating a high-resolution moving image, according to an embodiment.

The image processing apparatus 100 according to an embodiment may generate a first high-resolution image S'(t) of a current frame by using a low-resolution image L(t) of a current frame. The image processing apparatus 100 may extract feature information regarding a low-resolution image of the current frame and upscale the extracted feature information to generate the first high-resolution image S'(t).

Meanwhile, the first high-resolution image S'(t) may be a high-resolution image in which resolution flickering is not removed. Flickering may refer to a phenomenon in which a pattern (or a texture) in an identical object included in a frame is not maintained constant, but jitters or flickers, depending on the frame.

The image processing apparatus 100 according to an embodiment may generate a second high-resolution image S(t) in which flickering of the first high-resolution image S'(t) has been removed, by using a high-resolution image S(t−1) of a previous frame and the first high-resolution image S'(t) of the current frame. In this case, the image processing apparatus 100 may remove flickering of the first high-resolution image S'(t) by performing a convolution operation on the first high-resolution image S'(t) and the high-resolution image S(t−1) of the previous frame using a second convolutional neural network.

Alternatively, the image processing apparatus 100 may perform motion estimation and compensation by using the first high-resolution image S'(t) of the current frame and the high-resolution image S(t−1) of the previous frame, and generate the second high-resolution image S(t) in which flickering has been removed, by using a motion-compensated image and the first high-resolution image S'(t).

Meanwhile, the image processing apparatus 100 may remove flickering of a high-resolution image S'(t+1) of the next frame, by using the generated second high-resolution image S(t). Thus, correlation may be reinforced between the high-resolution image S(t) of the current frame from which flickering has been removed and the high-resolution image S(t+1) of the next frame from which flickering has been removed.

Figure 2:
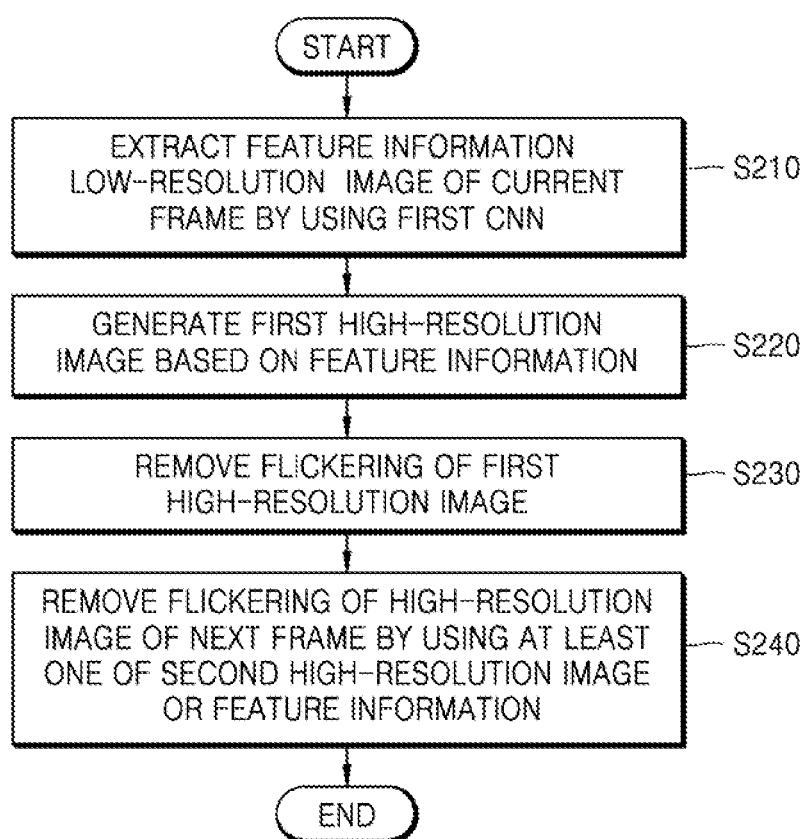
FIG. 2 is a flowchart of an operation method of an image processing apparatus, according to an embodiment.

FIG. 2 is a flowchart of an operation method of an image processing apparatus, according to an embodiment.

Referring to FIG. 2, the image processing apparatus 100 according to an embodiment may extract feature information regarding a low-resolution image of a current frame by using a first convolutional neural network (CNN), in operation S210.

For example, the image processing apparatus 100 may generate a feature map (feature information) by convoluting an input image with one or more kernels or filters in each of a plurality of convolution layers included in the first convolutional neural network. In this case, feature maps generated in early convolution layers may include low-level features and may gradually complicated features toward latter convolution layers.

The image processing apparatus 100 may generate a first high-resolution image based on the extracted feature information, in operation S220.

For example, the image processing apparatus 100 may generate the first high-resolution image by upscaling the extracted feature information. In this case, the image processing apparatus 100 may generate the first high-resolution image by applying, to the extracted feature information, at least one of a bilinear interpolation method, a bicubic interpolation method, or a convolutional interpolation method. However, the disclosure is not limited to this example.

The image processing apparatus 100 may remove flickering of the first high-resolution image, in operation S230.

The image processing apparatus 100 may remove flickering of the first high-resolution image of the current frame, by using a second convolutional neural network. In this case, flickering-removed high-resolution images in the previous frame and the first high-resolution image may be input to the second convolutional neural network, and the flickering-removed second high-resolution image of the current frame may be output from the second convolutional neural network.

Alternatively, the image processing apparatus 100 may generate high-resolution images of previous frames by upscaling respective feature information of previous frames, and input the generated high-resolution images of the previous frames and the first high-resolution image to the second convolutional neural network, thereby generating the flickering-removed second high-resolution image of the current frame.

The image processing apparatus 100 may remove flickering of a high-resolution image of a next frame by using at least one of the flickering-removed second high-resolution image or the extracted feature information, in operation S240.

The image processing apparatus 100 may store the feature information extracted from the first convolutional neural network or the second high-resolution image output from the flickering-removed second convolutional neural network in the memory. The image processing apparatus 100 may use the high-resolution image or the feature information for the current frame, which are stored in the memory, to remove flickering of the high-resolution image of the next frame.

Figure 3:
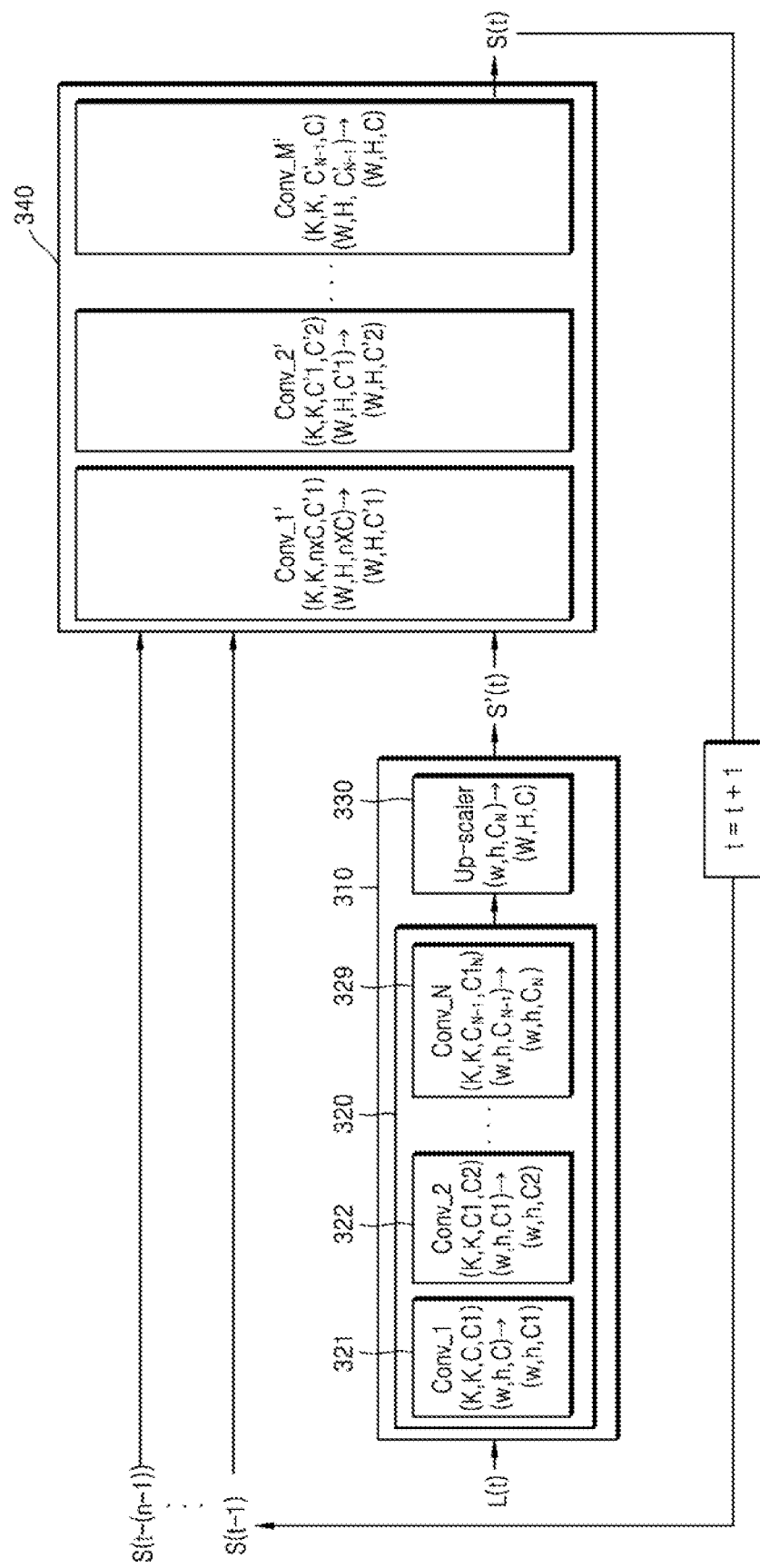
FIG. 3 is a view referred to for describing a method, performed by an image processing apparatus, of generating a high-resolution image and removing flickering, according to an embodiment.

FIG. 3 is a view referred to for describing a method, performed by an image processing apparatus, of generating a high-resolution image and removing flickering, according to an embodiment.

Referring to FIG. 3, the image processing apparatus 100 may include a high-resolution image generator 310 and a second convolutional neural network 340. The high-resolution image generator 310 may include a first convolutional neural network 320 and an upscaler 330. The image processing apparatus 100 may generate a high-resolution image from a low-resolution image by using the first convolutional neural network 320 and the upscaler 330. The first convolutional neural network 320 may include N convolution layers Conv_1, Conv_2, . . . , Conv_N.

Hereinbelow, an operation of the first convolutional neural network 320 will be described in detail with reference to FIGS. 4 through 6.

Figure 4:
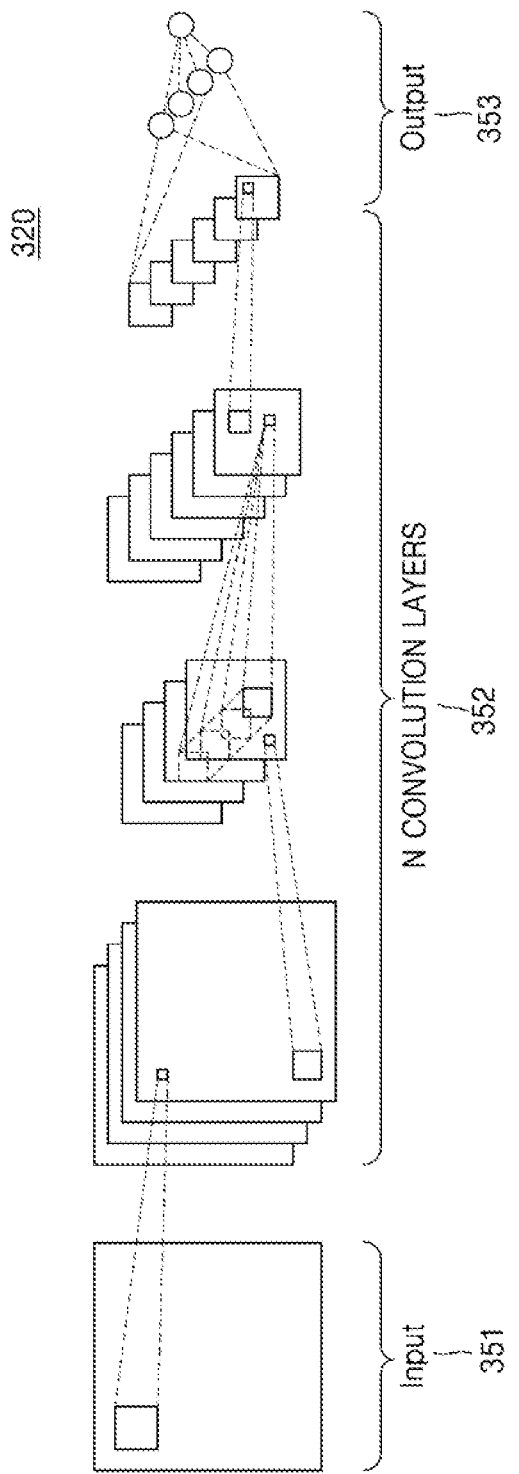
FIG. 4 illustrates a structure of a first convolutional neural network, according to an embodiment.

FIG. 4 illustrates a structure of a first convolutional neural network, according to an embodiment.

Referring to FIG. 4, the first convolutional neural network 320 may have a structure in which input data 351 (e.g., a low-resolution image) is input and passes through N convolution layers 352 and then output data 353 (e.g., feature information) is output. In this case, the first convolutional neural network 320 may be a deep convolutional neural network including two or more convolution layers.

The image processing apparatus 100 according to an embodiment may extract "features" like an edge, a line, a color, etc., from a low-resolution image, by using the first convolutional neural network 320. Each of the N convolution layers 352 included in the first convolutional neural network 320 may receive data and process the received data to generate output data. For example, the image processing apparatus 100 may generate a first feature map by convoluting an image (e.g., a low-resolution image) input to a first convolution layer Conv_1 321 with one or more kernels or filters. The image processing apparatus 100 may input the generated first feature map to a second convolution layer Conv_2 322 to convolute the first feature map input from the second convolution layer Conv_2 322 with one or more kernels or filters, thereby generating a second feature map.

Initial convolution layers of the first convolutional neural network 320 may operate to extract low-level features such as edges or gradients from the input image. Toward latter convolution layers, gradually complicated features (e.g., an eye, a nose, a mouth, a face, etc.) may be extracted.

One or more convolution layers to and from which a feature map is input and output in the first convolutional neural network 320 may be hidden layers (e.g., hidden convolution layers). In the first convolutional neural network 320, processing operations other than convolution that applies one or more kernels to a feature map may be performed. For example, operations such as an activation function, pooling, etc., may be performed. The image processing apparatus 100 may apply an activation function to change values of a feature map extracted by performing convolution into a nonlinear value indicating "existence" or "absence" of a feature. In this case, a ReLu function may be used, without being limited thereto. The image processing apparatus 100 may perform sub-sampling (pooling) to reduce a size of the extracted feature map. In this case, max pooling, average pooling, L2-norm pooling, etc., may be used, without being limited thereto.

Figure 5:
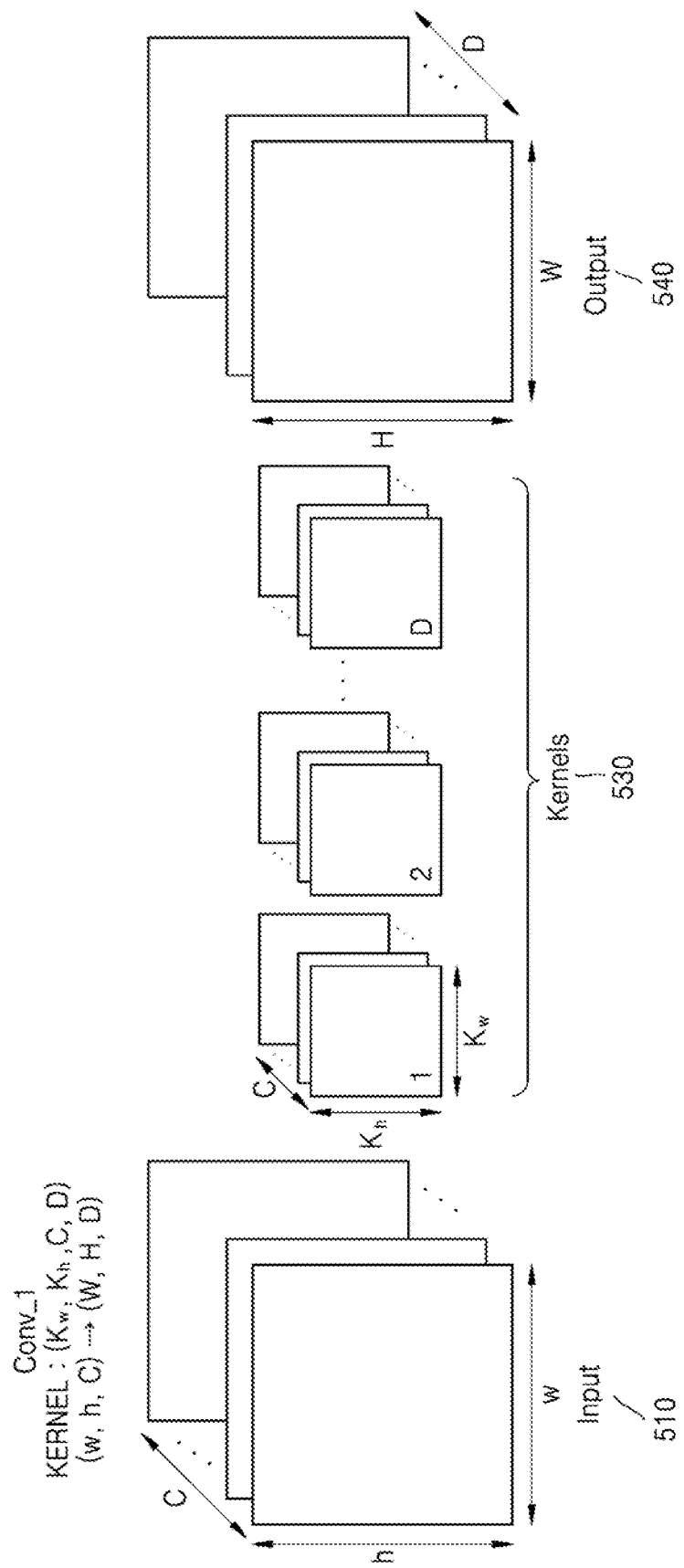
FIG. 5 illustrates input data, kernels, and output data of a first convolution layer included in a first convolutional neural network, according to an embodiment.

FIG. 5 illustrates input data, kernels, and output data of a first convolution layer included in a first convolutional neural network, according to an embodiment.

Referring to FIG. 5, the first convolutional neural network according to an embodiment may include N convolution layers 352, and hereinbelow, the first convolution layer will be referred to as the first convolution layer Conv_1.

Input data 510 (first input data) in the first convolution layer Conv_1 may be a low-resolution image according to an embodiment, and a size of the input data 510 may be w*h*C (width*height*channel). For example, the size of the low-resolution image may be w*h, and the number of channels C may be, but not limited to, 3 (e.g., R, G, B). One or more kernels 530 (first kernels) in the first convolution layer Conv_1 may have a size of Kw*Kh, and the number of kernels may be C*D (the number of input channels*the number of output channels).

In the first convolution layer Conv_1, by convoluting the first input data 510 with the first kernels 530, first output data 540 may be generated. The first output data 540 may include one or more feature maps, and the size of the first output data 540 may be W*H*D, the size of one feature map may be W*H, and the number of feature maps (or the number of channels) may be D.

Figure 6:
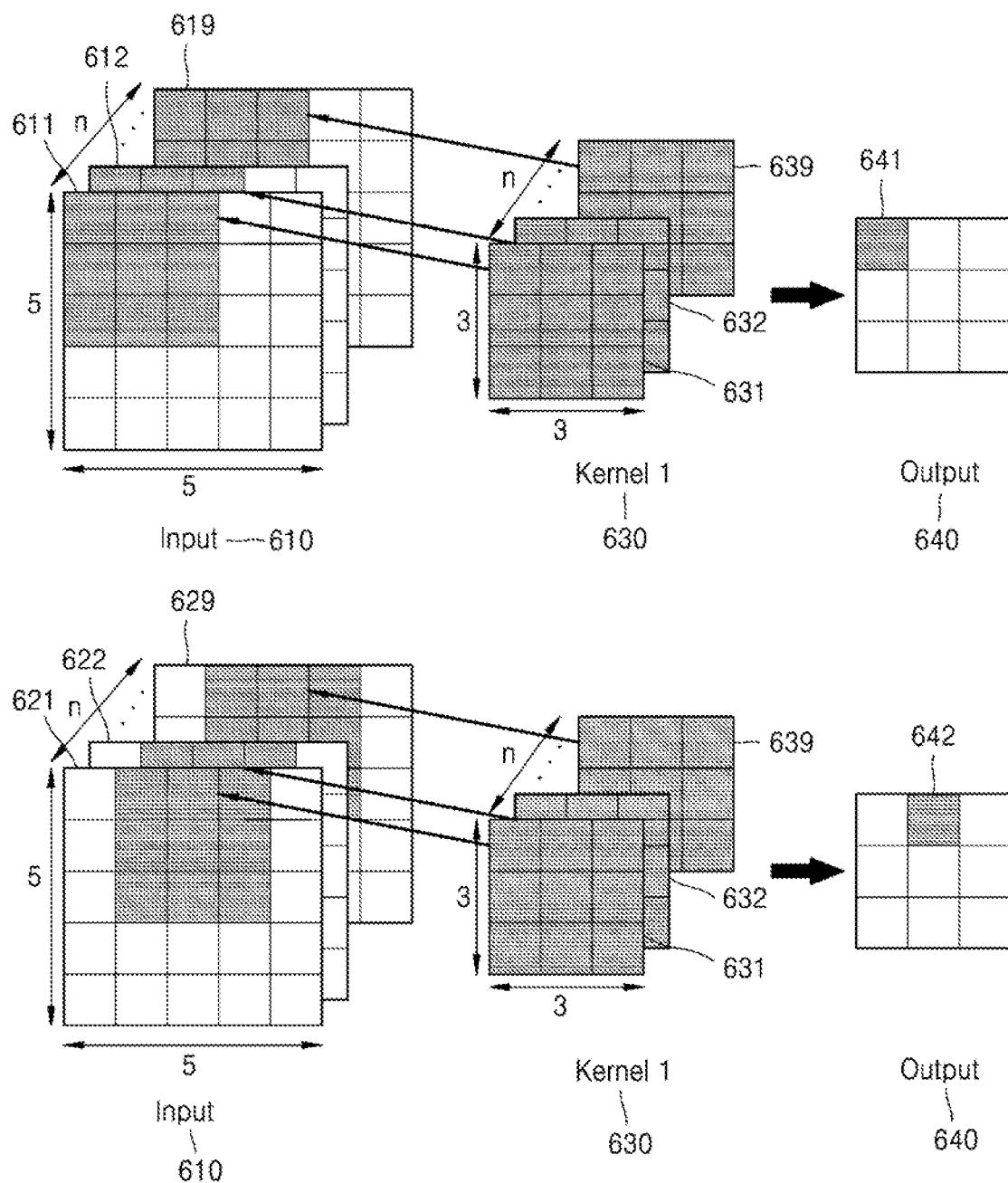
FIG. 6 is a view referred to for describing a process of processing a convolutional operation in the first convolution layer of FIG. 5.

FIG. 6 is a view referred to for describing a process of processing a convolutional operation in the first convolution layer of FIG. 5.

It will be assumed for convenience of description in FIG. 6 that input data 610 of the first convolution layer Conv_1 has a size of 5*5 and the number of channels is n. It is also assumed that the size of a kernel applied to the input data 610 is 3*3*n and the number of kernels is D. In this case, n indicating a depth of the kernel may be equal to the number of channels of the input data 610. The number of channels of the input data 610 may be determined depending on the number of kernels used in a layer previous to a current layer. That is, one kernel may include n sub-kernels 631, 632, . . . , 639 having a size of 3*3, in which n sub-kernels 621, 622, . . . , 629 may correspond to n channels of the input data 610, respectively.

Referring to FIG. 6, a process is illustrated in which a feature of the input data 610 is extracted by applying the sub-kernels 631, 632, . . . , 639 included in a first kernel 630 from the left upper end of the input data 610 to the right lower end of the input data 610. For example, a convolution operation may be performed by applying the first kernel 3*3*n 630 to pixels included in left upper end 3*3*n regions 611, 612, . . . , 619 of the input data 610. That is, the pixels included in the left upper end 3*3*n regions 611, 612, . . . , 619 and weight values included in the first kernel 630 are multiplied and summed, thereby generating one pixel 641 mapped to the left upper 3*3*n regions.

The pixels included in 3*3*n regions 621, 622, . . . , 629 moved by one pixel to the right from the left upper end 3*3*n regions 611, 612, . . . , 619 of the input data 610 and the weight values included in the first kernel 630 are multiplied and summed, thereby generating one pixel 642 mapped to the 3*3*n regions 621, 622, . . . , 629. In the same manner, while scanning a target of a convolution operation in the input data 610, from the left to the right and from top to bottom pixel-by-pixel, the weight values included in the first kernel 630 may be multiplied and products are summed, thereby generating pixels. Thus, a 3*3 feature map (output data) 640 may be output. Data that is subject to the convolution operation may be scanned pixel by pixel, but may also be scanned in the unit of two or more pixels. The number of pixels by which input data is moved during scanning may be referred to as a stride, and the size of an output feature map may be determined based on a size of the stride.

Referring to FIG. 6, the input data 610 may have a size of 5*5, but the output data 640 may have a size of 3*3 which is less than the size of the input data. The convolutional neural network may include several convolution layers, in which the size of data continuously decreases as the data passes through the several convolution layers. In this case, when the size of the data decreases before a feature is sufficiently extracted, the feature of the input data may be lost and to prevent this loss, padding may be performed. Padding may mean increasing the size of the input data by giving a particular value (e.g., '0') to an edge of the input data to prevent the size of the output data from decreasing. However, the disclosure is not limited to this example.

While a result of the convolution operation with respect to the first kernel 630 has been shown in FIG. 6, a 3*3*D feature map may be output when the convolution operation is performed with respect to D kernels. That is, the number of channels of output data, D, may be determined according to the number of kernels, D, such that the number of channels of input data in a next layer may be determined.

Referring back to FIG. 3, the first convolutional neural network 320 may include the N convolution layers 321, 322, . . . , 329, each of which may include one or more kernels. For example, the size of the input data of the first convolution layer Conv_1 321 may be w*h*C, in which w indicates a width of the input data, h indicates a height of the input data, and C indicates the number of channels (depth) of the input data. The size of the kernels of the first convolution layer Conv_1 321 may be K*K*C, in which the number of kernels is C1. In this case, K indicates a width and a height of a kernel and C indicates a depth of the kernel. The size of a feature map (output data) output as a result of performing a convolution operation in the first convolution layer Conv_1 321 may be w*h*C1. In this case, to cause a width and a height of the input data to be the same as those of the output data, padding may be performed, without being limited thereto. The size of input data of the second convolution layer Conv_2 322 may be equal to the size of the output data of the first convolution layer Conv_1 321, in which the size of kernels of the second convolution layer Conv_2 322 may be K*K*C1 and the depth of the kernel may be equal to the number of channels of the input data, C1, and the number of kernels of a previous layer (the first convolution layer Conv_1 321), C1. The number of kernels may be C2, such that the size of a second feature map (output data) output as a result of performing a convolution operation in the second convolution layer Conv_2 322 may be w*h*C2. By repeating this process in N convolution layers, the size of a finally output feature map (output data) may be w*h*CN in which CN indicates the number of kernels in an $N^{th}$ convolution layer Conv_N 329.

The image processing apparatus 100 according to an embodiment may generate a first high-resolution image based on a feature map (feature information) output from the $N^{th}$ convolution layer Conv_N 329. For example, the image processing apparatus 100 may generate the first high-resolution image having a size of W*H*C by upscaling the feature map having a size of w*h*CN. In this case, W and H may be equal to or greater than w and h, respectively. The image processing apparatus 100 may generate the first high-resolution image by applying at least one of a bilinear interpolation method, a bicubic interpolation method, or a convolutional interpolation method to the feature map (feature information) extracted in the first convolution neural network. However, the disclosure is not limited to this example. Meanwhile, the bilinear interpolation method, the bicubic interpolation method, and the convolutional interpolation method are already known techniques, and thus will not be described in detail.

The generated first high-resolution image S'(t) may include flickering. The image processing apparatus 100 may generate a second high-resolution image S(t) in which flickering is removed from the first high-resolution image S'(t), based on flickering-removed high-resolution images S(t−1), ..., S(t−(n−1)) processed in frames previous to a current time t and a flickering-included high-resolution image (the first high-resolution image S'(t)) of the current frame.

The image processing apparatus 100 according to an embodiment may store the flickering-removed high-resolution images S(t−1), ..., S(t−(n−1)) in the memory when the image processing apparatus 100 processes the frames previous to the current time t.

The image processing apparatus 100 may use the second convolutional neural network 340 to remove flickering of the first high-resolution image S'(t), in which the second convolutional neural network 340 may include M convolution layers.

The flickering-removed high-resolution images S(t−1), ..., S(t−(n−1)) processed in the frames previous to the current time t and the flickering-included high-resolution image (the first high-resolution image S'(t)) of the current frame may be input to the second convolutional neural network 340 and pass through M convolution layers Conv_1', Conv_2', ..., Conv_M', such that a convolution operation may be performed. Data input to the first convolution layer Conv_1' of the second convolutional neural network 340 may include n flickering-included high-resolution images (the high-resolution image S'(t) of the current frame) and the flickering-removed high-resolution images S(t−1), ..., S(t−(n−1)) processed in previous frames. In this case, the size of the input data may be W*H*n*C, in which W and H indicate the width and the height of the high-resolution images, n indicates the number of high-resolution images, and C indicates the number of channels included in one high-resolution image. The size of the kernels of the first convolution layer may be K*K*n*C, in which the number of kernels is C'1. In this case, K indicates a width and a height of a kernel and n*C indicates a depth of the kernel. The size of a feature map (output data) output as a result of performing a convolution operation in the first convolution layer may be W*H*C'1. In this case, to cause a width and a height of the input data to be the same as those of the output data, padding may be performed, without being limited thereto.

The convolution operation performed in the convolution layers Conv_1', Conv_2', ..., Conv_M' of the second convolutional neural network 340 is the same as that described regarding the first convolutional neural network, and thus will not be described in detail. However, a plurality of images are input to the second convolutional neural network 340, such that the convolution operation performed in the second convolutional neural network 340 may be a three-dimensional (3D) operation.

In addition, the size of input data of the second convolution layer Conv_2' may be equal to the size of the output data of the first convolution layer Conv_1', in which the size of kernels of the second convolution layer may be K*K*C'1 and the depth of the kernel C'1 may be equal to the number of channels of the input data, C'1, and the number of kernels of a previous layer (the first convolution layer), C'1. The number of kernels may be C'2, such that the size of a second feature map (output data) output as a result of performing a convolution operation in the second convolution layer may be W*H*C'2. By repeating this process in M convolution layers Conv_1', Conv_2', ..., Conv_M', the size of a finally output feature map (output data) may be W*H*C'M, in which C'M indicates the number of kernels of an $M^{th}$ convolution layer. The number of kernels of the $M^{th}$ convolution layer may be equal to the number of channels of a high-resolution image, C, in which the size of finally output data may be W*H*C. In this case, the finally output data may be the flickering-removed high-resolution image S(t) of the current frame.

The image processing apparatus 100 according to an embodiment may store the flickering-removed high-resolution image S(t) generated in the current frame in the memory, in which the high-resolution image S(t) stored in the memory may be used to remove flickering of a high-resolution image S'(t+1) of a next frame. For example, when the image processing apparatus 100 processes an image of a next frame, the image processing apparatus 100 may input the high-resolution image S(t) of the current frame to the second convolutional neural network 340. However, the disclosure is not limited to this example.

Figure 7:
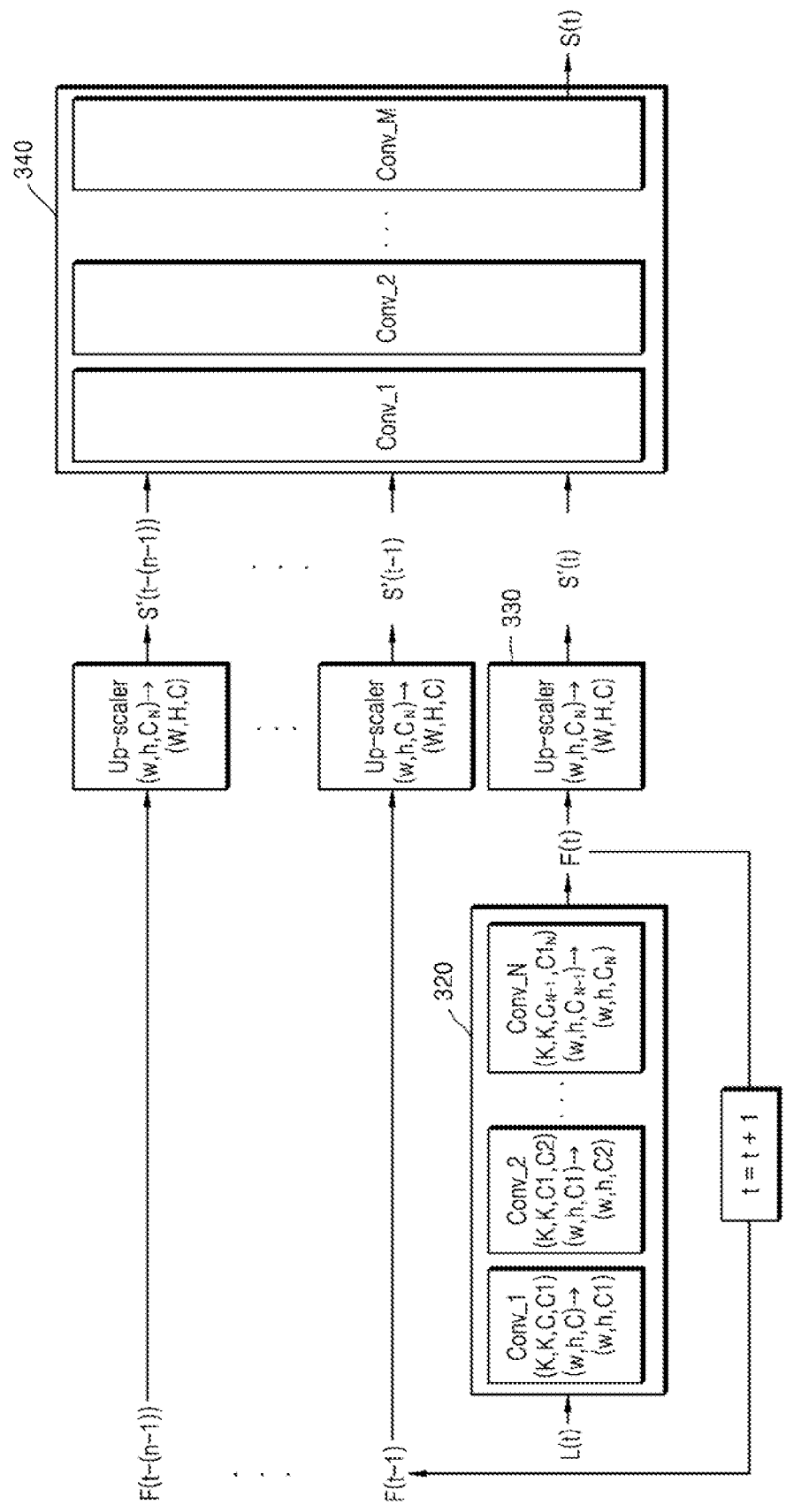
FIG. 7 is a view referred to for describing a method, performed by an image processing apparatus, of removing flickering, according to an embodiment.

FIG. 7 is a view referred to for describing a method, performed by an image processing apparatus, of removing flickering, according to an embodiment.

Referring to FIG. 7, the image processing apparatus 100 may generate a high-resolution image from a low-resolution image L(t) by using the first convolutional neural network 320 and the upscaler 330. For example, the image processing apparatus 100 may extract a feature map (feature information) F(t) of an image of a current frame by using the first convolutional neural network 320 and upscale the feature map (the feature information) to generate the first high-resolution image S'(t).

The first convolutional neural network 320 and the upscaler 330 are the same as the first convolutional neural network 320 and the upscaler 330 of FIG. 3 and thus will not be described in detail.

The image processing apparatus 100 may store the feature map F(t) of the current frame, extracted in the first convolutional neural network 320, in the memory, in which the feature map F(t) of the current frame stored in the memory may be used to remove flickering of the high-resolution image S'(t+1) of a next frame (t+1). For example, when the image processing apparatus 100 processes an image of a next frame, the image processing apparatus 100 may input the high-resolution image S'(t) in which the feature map F(t) of the current frame is upscaled, to the second convolutional neural network 340. However, the disclosure is not limited to this example.

In addition, the image processing apparatus 100 may remove flickering of the generated high-resolution image S'(t) by using the second convolutional neural network 340. The image processing apparatus 100 may generate high-resolution images S'(t−1), ..., S'(t−(n−1)) of previous frames, based on feature maps (feature information) F(t−1), ..., F(t−(n−1)) extracted in frames previous to the current time.

The image processing apparatus 100 according to an embodiment may store the feature maps F(t−1), ..., F(t−(n−1)) extracted in the first convolutional neural network 320 in the memory when the image processing apparatus 100 processes the frames previous to the current time t. In this case, by storing the feature maps F(t−1), ..., F(t−(n−1)) in place of the high-resolution images S(t−1), ..., S(t−(n−1)) of the previous frames in the memory, the size of the memory may be reduced.

The image processing apparatus 100 may generate the high-resolution images S'(t−1), ..., S'(t−(n−1)) having a size of W*H*C by respectively upscaling the feature maps F(t−1), ..., F(t−(n−1)) having a size of w*h*CN. In this case, W and H may be equal to or greater than w and h, respectively. The generated high-resolution images S'(t−1), . . . , S'(t−(n−1)) of the previous frames may be high-resolution images including flickering.

The image processing apparatus 100 may generate the second high-resolution image S(t) in which flickering is removed from the first high-resolution image S'(t), by inputting the flickering-included high-resolution images S'(t−1), . . . , S'(t−(n−1)) of the previous frames and the flickering-included first high-resolution image S'(t) of the current frame.

Figure 8:
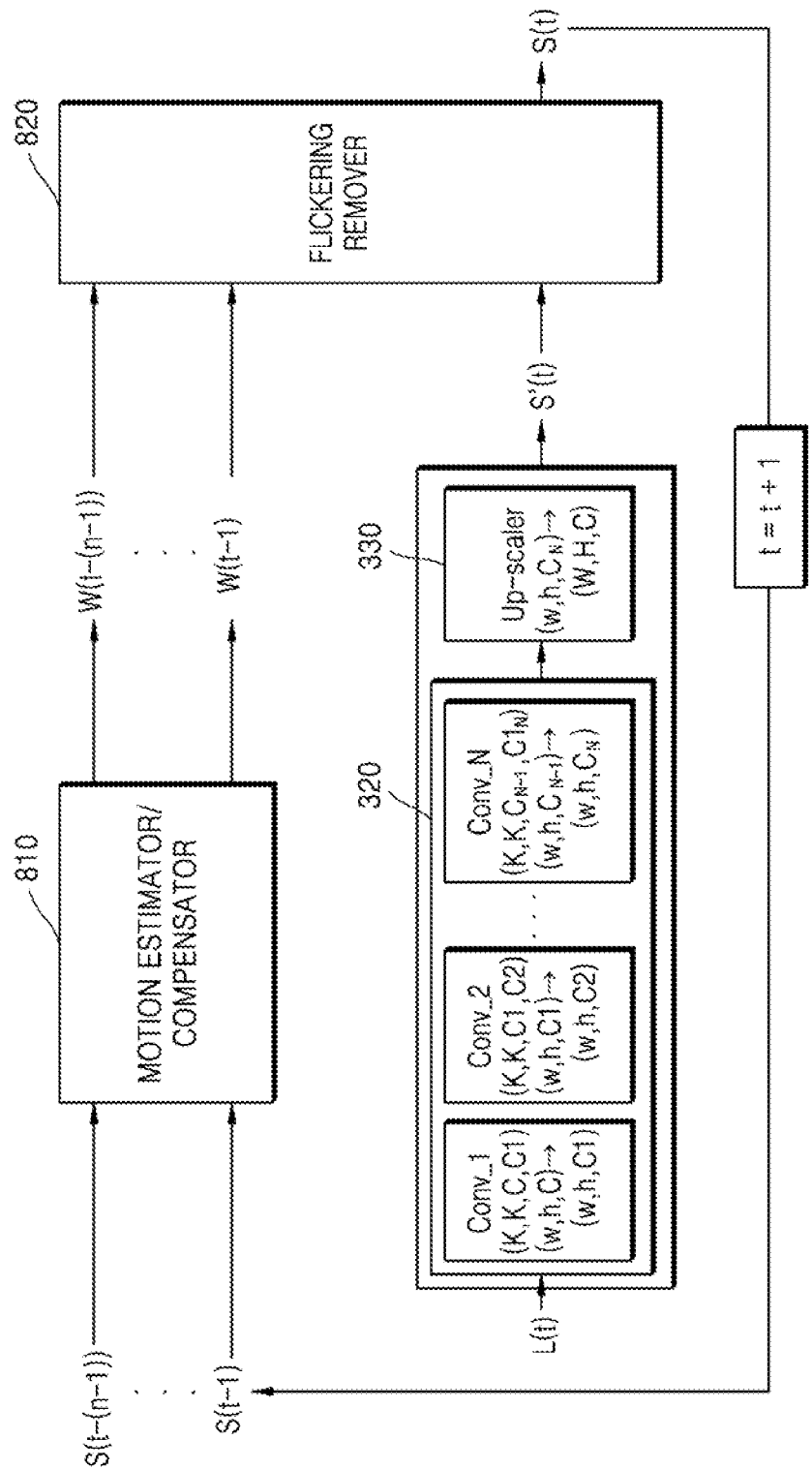
FIG. 8 is a view referred to for describing a method, performed by an image processing apparatus, of removing flickering, according to an embodiment.

FIG. 8 is a view referred to for describing a method, performed by an image processing apparatus, of removing flickering, according to an embodiment.

Referring to FIG. 8, the image processing apparatus 100 may generate the high-resolution image S'(t) from the low-resolution image L(t) by using the first convolutional neural network 320 and the upscaler 330. For example, the image processing apparatus 100 may extract a feature map (feature information) of an image of a current frame by using the first convolutional neural network 320 and upscale the feature map to generate the first high-resolution image S'(t).

The first convolutional neural network 320 and the upscaler 330 are the same as the first convolutional neural network 320 and the upscaler 330 of FIG. 3 and thus will not be described in detail.

Meanwhile, the image processing apparatus 100 may include a motion estimator/compensator 810. The motion estimator/compensator 810 may perform motion estimation and compensation, based on flickering-removed high-resolution images S(t−1), . . . , S(t−(n−1)) processed in frames previous to the current time t and the first high-resolution image S'(t) of the current frame.

The motion estimator/compensator 810 may perform motion estimation and compensation, thereby warping the high-resolution images S(t−1), . . . , S(t−(n−1)) of the previous frames to the current time. In this case, warping, which is a type of geometric deformation, may mean mapping a pixel at a position (x, y) in an image to (x', y'). The image processing apparatus 100 may perform deformation to match a position of an object in a previous frame to a position of the object in a current frame, based on motion of the object estimated between the previous frame and the current frame.

Thus, high-resolution images of previous frames may be warped to the current time t, thereby generating (n−1) high-resolution images W(t−1), . . . , W(t−(n−1)).

Meanwhile, the image processing apparatus 100 according to an embodiment may include a flickering remover 820. The flickering remover 820 may remove flickering of the first high-resolution image S'(t), based on the (n−1) warped high-resolution images W(t−1), . . . , W(t−(n−1)) and the first high-resolution image S'(t) of the current frame generated through the first convolutional neural network 320 and the upscaler 330. For example, the flickering remover 820 may remove flickering of the first high-resolution image S'(t) by averaging n input images. However, various flickering removal techniques may be used without being limited to the example.

Figure 9:
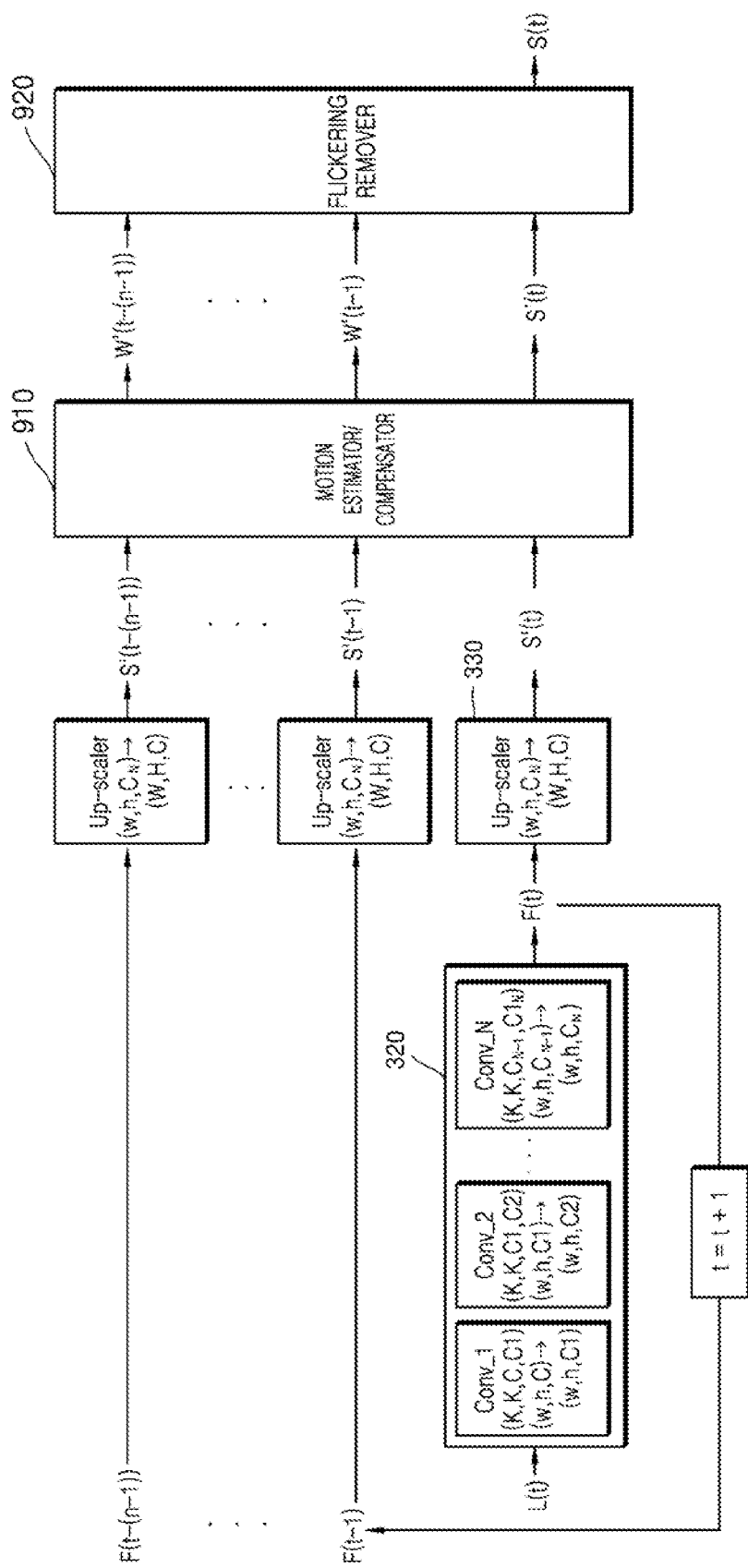
FIG. 9 is a view referred to for describing a method, performed by an image processing apparatus, of removing flickering, according to an embodiment.

FIG. 9 is a view referred to for describing a method, performed by an image processing apparatus, of removing flickering, according to an embodiment.

Referring to FIG. 9, the image processing apparatus 100 may generate the high-resolution image S'(t) from the low-resolution image L(t) by using the first convolutional neural network 320 and the upscaler 330. For example, the image processing apparatus 100 may extract a feature map (feature information) of an image of a current frame by using the first convolutional neural network 320 and upscale the feature map to generate the first high-resolution image S'(t). The first high-resolution image S'(t) may be an image including flickering.

The first convolutional neural network 320 and the upscaler 330 are the same as the first convolutional neural network 320 and the upscaler 330 of FIG. 3 and thus will not be described in detail.

Meanwhile, the image processing apparatus 100 may store the feature map F(t) of the current frame, extracted in the first convolutional neural network 320, in the memory, in which the feature map F(t) of the current frame stored in the memory may be used to remove flickering of the high-resolution image S'(t+1) of a next frame.

The image processing apparatus 100 may perform motion estimation and compensation, based on the feature maps F(t−1), . . . , F(t−(n−1)) extracted in frames previous to the current time t and the first high-resolution image S'(t) of the current frame.

The image processing apparatus 100 according to an embodiment may store the feature maps F(t−1), . . . , F(t−(n−1)) extracted in the first convolutional neural network 320 in the memory when the image processing apparatus 100 processes the frames previous to the current time. In this case, by storing the feature maps F(t−1), . . . , F(t−(n−1)) in place of the high-resolution images of the previous frames in the memory, the size of the memory may be reduced.

The image processing apparatus 100 may upscale the feature maps F(t−1), . . . , F(t−(n−1)) of the previous frame to generate the high-resolution images S'(t−1), . . . , S'(t−(n−1)), in which the generated high-resolution images may be images including flickering.

The image processing apparatus 100 may include a motion estimator/compensator 910 which may perform motion estimation and compensation based on the flickering-included high-resolution images S'(t−1), . . . , S'(t−(n−1)) of previous frames and the flickering-included first high-resolution image S'(t) of the current frame. Thus, high-resolution images of previous frames may be warped to the current time t, thereby generating (n−1) high-resolution images W(t−1), . . . , W(t−(n−1)).

The image processing apparatus 100 may include a flickering remover 920 which may remove flickering of the high-resolution image S'(t) based on the), (n−1) warped high-resolution images W'(t−1), . . . , WV−(n−1)) and the first high-resolution image S'(t) of the current frame. For example, the flickering remover 920 may remove flickering of the first high-resolution image S'(t) by averaging n input images. However, various flickering removal techniques may be used without being limited to the example.

Figure 10:
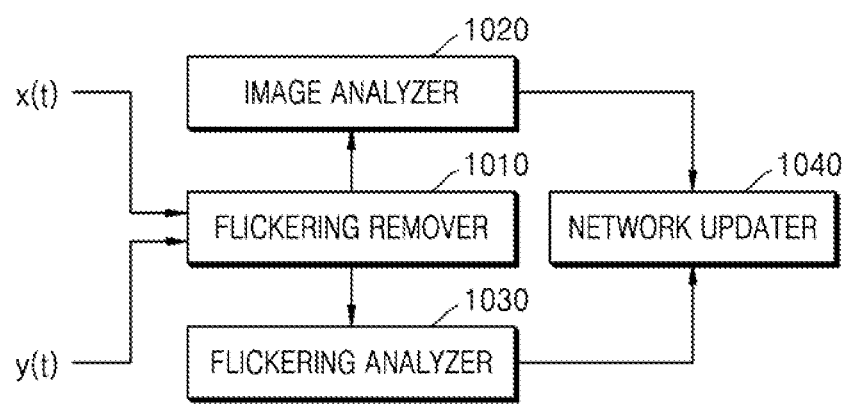
FIGS. 10 and 11 are views referred to for describing a method of training a first convolutional neural network and a second convolutional neural network, according to an embodiment.
Figure 11:
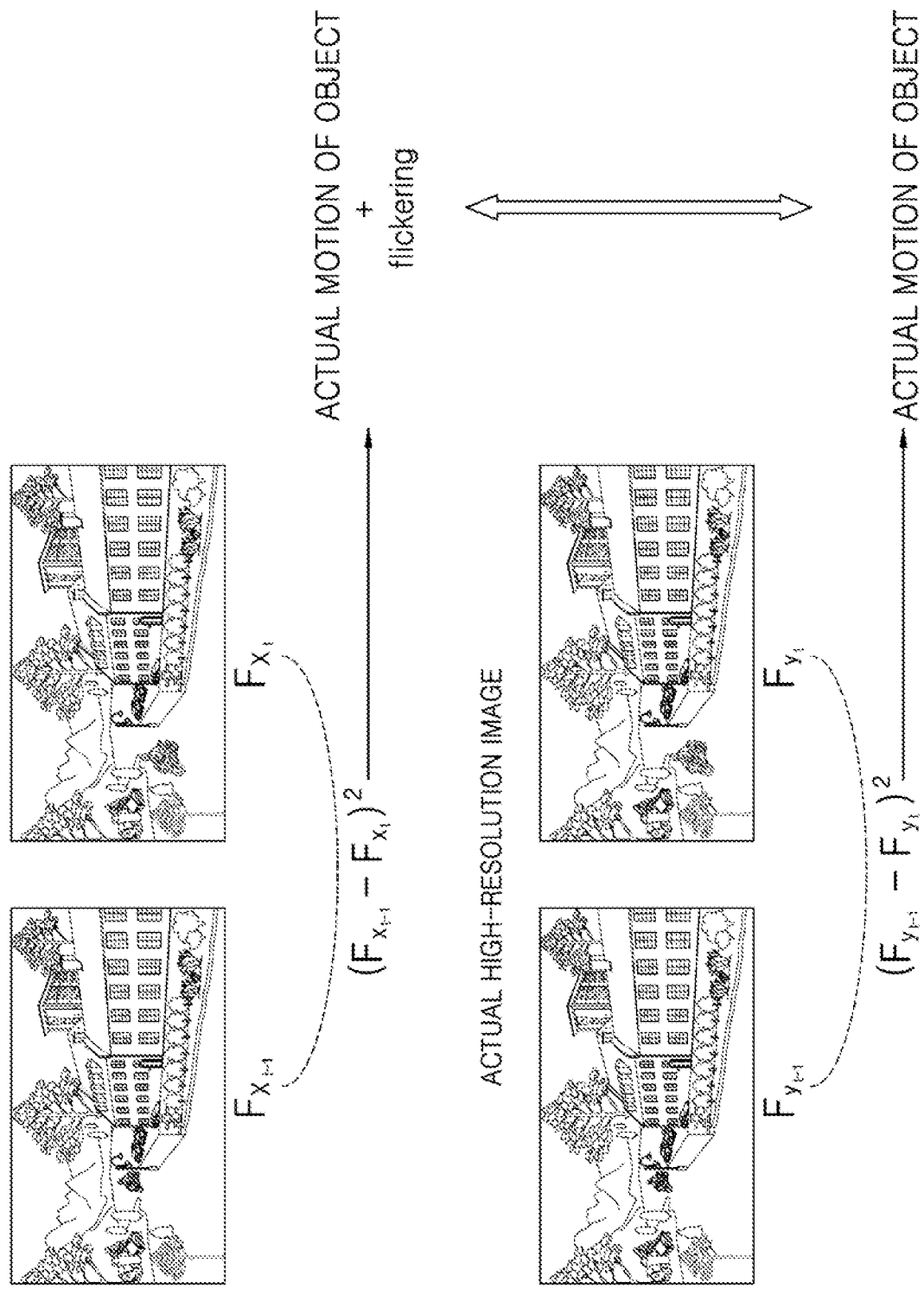

FIGS. 10 and 11 are views referred to for describing a method of training a first convolutional neural network and a second convolutional neural network, according to an embodiment.

Referring to FIG. 10, the image processing apparatus 100 according to an embodiment may include an image feature extractor 1010, an image analyzer 1020, and a flickering analyzer 1030. The image feature extractor 1010 may receive a flickering-removed high-resolution image x(t) of the current frame generated in the image processing apparatus 100 and an actual high-resolution image y(t) of the current frame.

In this case, the actual high-resolution image y(t) of the current frame may be provided as training data. The image feature extractor 1010 may extract one or more feature maps (feature information) of the generated high-resolution image x(t) and the actual high-resolution image y(t).

The image feature extractor 1010 may extract feature maps of the generated high-resolution image x(t) and the actual high-resolution image y(t) by using a convolutional neural network which may include a plurality of convolution layers in which a convolution operation may be performed. The image feature extractor 1010 may perform operations such as an activation function, pooling, etc., in addition to the convolution operation. In this case, a feature map may be extracted for every convolution layer.

The image feature extractor 1010 may extract low-level features like edges or gradients of an input image in initial convolution layers, and may extract gradually complicated features (e.g., an eye, a nose, a mouth, a face, etc.) toward latter convolution layers.

The image analyzer 1020 may analyze a difference between a feature map $F_x$ of the generated high-resolution image and a feature map $F_y$ of the actual high-resolution image. The difference between the feature map $F_x$ of the generated high-resolution image and the feature map $F_y$ of the actual high-resolution image may be expressed as Equation 1.

$$E_{l,image} = \sum_{t}\sum_{i,k}(F^l_{x_t,ik} - F^l_{y_t,ik})^2 \qquad \text{[Equation 1]}$$

Herein, F' indicates a feature map extracted in an $l^{th}$ layer of the image feature extractor, $x_t$ indicates a high-resolution image generated in a frame at a time t, and $y_t$ indicates an actual high-resolution image at the time t. i and k indicate a position of a pixel of a feature map.

Thus, $F_{x_t,ik}^l$ may mean a pixel located at (i, k) of a feature map extracted in the $l^{th}$ layer of the image feature extractor for the high-resolution image generated in a frame at the time t. $F_{y_t,ik}^l$ may mean a pixel located at (i, k) of a feature map extracted in the $l^{th}$ layer of the image feature extractor for the actual high-resolution image of the frame at the time t.

A network updater 1040 may adjust a weight value of kernels of the first convolutional neural network 320 to reduce a difference $E_{l,image}$ between the feature map of the generated high-resolution image and the feature map of the actual high-resolution image.

Meanwhile, the flickering analyzer 1030 may calculate a difference (a first difference) between a feature map of a high-resolution image generated in a previous frame and a feature map of a high-resolution image generated in a current frame and a difference (a second difference) between a feature map of an actual high-resolution image of the previous frame and a feature map of an actual high-resolution image of the current frame and compare the first difference with the second difference, thereby analyzing flickering.

For example, referring to FIG. 11, the difference (the first difference, $F_{x_{t-1}} - F_{x_t})^2$) between the feature map of the high-resolution image generated in the current frame and the feature map of the high-resolution image generated in the previous frame may include actual motion of an object in an image and flickering. The difference (the second difference, $(F_{y_{t-1}} - F_{y_t})^2$) between the feature map of the actual high-resolution image of the current frame and the feature map of the actual high-resolution image of the previous frame may include actual motion of an object. Thus, by comparing the first difference with the second difference, flickering may be analyzed. Flickering may be expressed as Equation 2.

$$E_{l,flicker} = \sum_{t}\sum_{i,k}(F^l_{x_t,ik} - F^l_{x_{t-1},ik})^2 - (F^l_{y_t,ik} - F^l_{y_{t-1},ik})^2 \qquad \text{[Equation 2]}$$

Herein, $F^l$ indicates a feature map extracted in an $l^{th}$ layer of the image feature extractor, $x_t$ indicates a high-resolution image generated in a frame at a time t, and $y_t$ indicates an actual high-resolution image at the time t. i and k indicate a position of a pixel of a feature map.

Thus, $F_{x_t,ik}^l$ may mean a pixel located at (i, k) of a feature map extracted in the $l^{th}$ layer of the image feature extractor for the high-resolution image generated in a frame at the time t. $F_{t_k,ik}^l$ may mean a pixel located at (i, k) of a feature map extracted in the $l^{th}$ layer of the image feature extractor for the actual high-resolution image of the frame at the time t.

The network updater 1040 may adjust a weight value of kernels of the second convolutional neural network 340 to reduce the analyzed flickering $E_{l,flicker}$.

Figure 12:
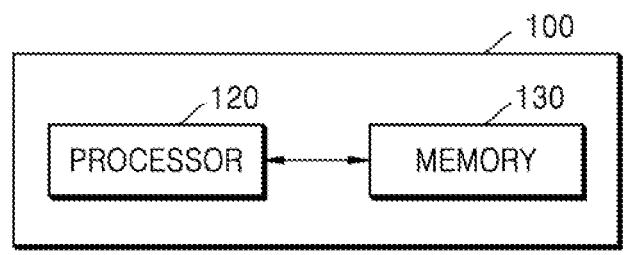
FIG. 12 is a block diagram of an image processing apparatus, according to an embodiment.

FIG. 12 is a block diagram of an image processing apparatus, according to an embodiment.

Referring to FIG. 12, the image processing apparatus 100 according to an embodiment may include a processor 120 and a memory 130.

The processor 120 according to an embodiment may control the image processing apparatus 100 overall. The processor 120 according to an embodiment may execute one or more programs stored in the memory 130.

The memory 130 according to an embodiment may store various data, programs, or applications for driving and controlling the image processing apparatus 100. The programs stored in the memory 130 may include one or more instructions. The programs (for example, one or more instructions) or applications stored in the memory 130 may be executed by the processor 120.

The processor 120 according to an embodiment may perform at least one of operations of the high-resolution image generator 310, the flickering removers 340, 820, and 920, the image feature extractor 1010, the image analyzer 1020, the flickering analyzer 1030, and the network updater 1040, shown in and described with reference to FIGS. 3 through 11.

For example, the processor 120 may extract a feature map from a low-resolution image by using the first convolutional neural network 320 and upscale the extracted feature map to generate a first high-resolution image. The processor 120 may remove flickering of the first high-resolution image generated in a current frame, based on the first high-resolution image generated in the current frame and flickering-removed high-resolution images processed in previous frames.

Meanwhile, the memory 130 according to an embodiment may store the flickering-removed high-resolution images and the flickering-removed high-resolution image generated at the current time, when frames previous to the current time are processed.

The processor 120 may remove flickering of the first high-resolution image of the current frame, by using the second convolutional neural network 340. In this case, flickering-removed high-resolution images in the previous frame and the first high-resolution image may be input to the second convolutional neural network, and the flickering-removed second high-resolution image of the current frame may be output from the second convolutional neural network 340.

The processor 120 may remove flickering of the first high-resolution image generated in the current frame, based on feature information extracted during processing of the previous frames.

For example, the memory 130 according to an embodiment may store the feature maps extracted in the first convolutional neural network, when the frames previous to the current time are processed. The processor 120 may upscale respective feature information of the previous frames to generate the high-resolution images of the previous frames. The processor 120 may input the high-resolution images of the previous frames and the first high-resolution image generated in the current frame to the second convolutional neural network 340 from which a flickering-removed second high-resolution image may be output.

The processor 120 may obtain high-resolution images warped to the current time by performing motion estimation and compensation, based on the flickering-removed high-resolution images processed in the previous frames and the first high-resolution image of the current frame. The processor 120 may remove flickering of the first high-resolution image based on the high-resolution images warped to the current time and the first high-resolution image of the current frame.

The processor 120 may upscale respective feature maps extracted in the previous frames to generate the high-resolution images of the previous frames. The processor 120 may obtain high-resolution images warped to the current time by performing motion estimation and compensation, based on the high-resolution images of the previous frames and the first high-resolution image of the current frame. The processor 120 may remove flickering of the first high-resolution image based on the high-resolution images warped to the current time and the first high-resolution image of the current frame.

Figure 13:
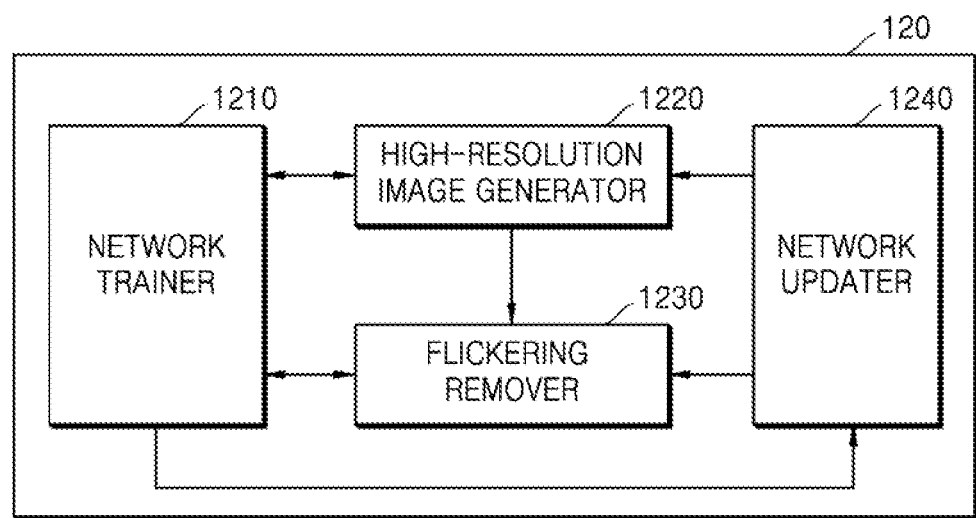
FIG. 13 is a block diagram of a processor 120 according to an embodiment.

FIG. 13 is a block diagram of the processor 120 according to an embodiment.

Referring to FIG. 13, the processor 120 according to an embodiment may include a network trainer 1210, a high-resolution image generator 1220, a flickering remover 1230, and a network learner 1240.

The network trainer 1210 may learn a criterion for generating a high-resolution image and a criterion for removing flickering in the image processing apparatus 100. For example, the network trainer 1210 may train the first convolutional neural network and the second convolutional neural network according to an embodiment. The network trainer 1210 may obtain image data to be used for training and apply the obtained data to the first convolutional neural network, thereby learning the criterion for generating a high-resolution image. The network trainer 1210 may also apply the obtained data to the second convolutional neural network to learn the criterion for removing flickering from an image.

The network trainer 1210 may store the trained network (e.g., the first convolutional neural network and the second convolutional neural network) in the memory of the image processing apparatus. Alternatively, the network trainer 1210 may store the trained network in a memory of a server wiredly or wirelessly connected with the image processing apparatus.

The memory in which the trained network is stored may also store, for example, a command or data related to at least one other element of the image processing apparatus 100.

The high-resolution image generator 1220 may generate the high-resolution image by using the first convolutional neural network. The high-resolution image generator 1220 may extract feature information with the low-resolution image as an input value, by using the first convolutional neural network. The high-resolution image generator 1220 may generate the high-resolution image based on the extracted feature information.

The flickering remover 1230 may remove flickering of an image by using the second convolutional neural network. The flickering remover 1230 may remove flickering of a high-resolution image of the current frame with an image generated in the high-resolution image generator 1220 and high-resolution images generated in the previous frames as an input value, by using the second convolutional neural network. In this case, the flickering-removed high-resolution image may be used to update at least one of the first convolutional neural network or the second convolutional neural network, Meanwhile, the network trainer 1210 may train the network based on the high-resolution image generated by the high-resolution image generator 1220 and the flickering remover 1230. For example, the network trainer 1210 may train a network by using a training algorithm such as error back-propagation or gradient descent. The network trainer 1210 may compare the generated high-resolution image with an actual high-resolution image by analyzing them. The network trainer 1210 of FIG. 13 may correspond to the image feature extractor 1020, the image analyzer 1020, and the flickering analyzer 1030 described with reference to FIG. 10, and will not be described in detail.

The network updater 1240 may update a network by adjusting a weight value of kernels included in the first convolutional neural network and the second convolutional neural network, based on an analysis result of the network learner 1210.

At least one of the network trainer 1210, the high-resolution image generator 1220, the flickering remover 1230, or the network updater 1240 may be manufactured in the form of a hardware chip and mounted on the image processing apparatus. For example, at least one of the network trainer 1210, the high-resolution image generator 1220, the flickering remover 1230, or the network updater 1240 may be manufactured in the form of a dedicated hardware chip for artificial intelligence (AI), or may be manufactured as a part of an existing general-purpose processor (e.g., a central processing unit (CPU) or an application processor) or a dedicated graphics processor (e.g., a graphics processing unit (GPU)) and mounted on various image processing apparatuses described above.

The network trainer 1210, the high-resolution image generator 1220, the flickering remover 1230, and the network updater 1240 may be mounted on one image processing apparatus or separate image processing apparatuses, respectively. For example, some of the network trainer 1210, the high-resolution image generator 1220, the flickering remover 1230, and the network updater 1240 may be included in the image processing apparatus and other some thereof may be included in the server.

Alternatively, at least one of the network trainer 1210, the high-resolution image generator 1220, the flickering remover 1230, or the network updater 1240 may be implemented with a software module. When at least one of the network trainer 1210, the high-resolution image generator 1220, the flickering remover 1230, or the network updater 1240 is implemented with a software module (or a program module including an instruction), the software module may be stored in non-transitory computer-readable media. In this case, at least one software module is provided by an OS or by an application. Alternatively, a part of the at least one software module may be provided by an OS and another part thereof may be provided by an application.

Meanwhile, the block diagrams of the image display apparatus 100 and the processor 120 shown in FIGS. 12 and 13, respectively, are block diagrams for an embodiment. Elements of the block diagram may be integrated, added, or omitted depending on the specifications of the image processing apparatus 100 implemented actually. That is, when necessary, two or more elements may be integrated into one element or one element may be divided into two or more elements. A function executed in each element (or module) is intended to describe embodiments of the disclosure, and a detailed operation or apparatus thereof does not limit the scope of the disclosure.

The operation method of the image processing apparatus according to an embodiment may be feature implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include a machine language code created by a complier and a high-level language code executable by a computer using an interpreter.

The image processing apparatus for generating a high-resolution image and the operation method of the image processing apparatus according to disclosed embodiments may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of an S/W program electronically distributed through a manufacturer or the electronic device or an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include an S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or AI server, etc.) may execute a computer program product stored in the server to control the client device communicating with the server to perform the method according to the embodiments of the disclosure.

While the disclosure has been shown and described with reference to certain example embodiments thereof, the scope of the disclosure is not limited to the description and also includes various modifications and improvements made by those of ordinary skill in the art using the concept of the disclosure defined in the appended claims.

The invention claimed is:

1. An image processing apparatus for generating a high-resolution moving image, the image processing apparatus comprising:
a memory storing one or more instructions; and
a processor configured to execute the one or more instructions stored in the memory,
wherein the processor is configured to:
extract feature information regarding a low-resolution image of a current frame by using a first convolutional neural network (CNN),
generate, based on the feature information, a first high-resolution image of the current frame,
remove flickering of the first high-resolution image to generate a second high-resolution image of the current frame, by using a flickering-removed high-resolution image of a previous frame, whereby the second high-resolution image is a flickering-removed high-resolution image of the current frame, and
remove flickering of a high-resolution image of a next frame generated from a low-resolution image of the next frame, by using the second high-resolution image of the current frame.

2. The image processing apparatus of claim 1, wherein the first convolutional neural network comprises N convolution layers, and
the processor is further configured to extract the feature information by inputting the low-resolution image of the current frame to the first convolutional neural network and performing a convolution operation with one or more kernels in each of the N convolution layers.

3. The image processing apparatus of claim 1, wherein the processor is further configured to generate the first high-resolution image by applying, to the feature information, at least one of a bilinear interpolation method, a bicubic interpolation method, or a convolutional interpolation method.

4. The image processing apparatus of claim 1, wherein the processor is further configured to remove flickering of the first high-resolution image by inputting the first high-resolution image of the current frame and the flickering-removed high-resolution image of the previous frame to a second convolutional neural network and performing a convolution operation with one or more kernels in each convolution layer of the second convolutional neural network.

5. The image processing apparatus of claim 4, wherein the processor is further configured to extract first feature information corresponding to the second high-resolution image and second feature information corresponding to the actual high-resolution image of the current frame and update, based on the first feature information and the second feature information, at least one of the first convolutional neural network or the second convolutional neural network.

6. The image processing apparatus of claim 5, wherein the processor is further configured to adjust weight values of one or more kernels included in at least one of the first convolutional neural network or the second convolutional neural network.

7. The image processing apparatus of claim 6, wherein the processor is further configured to adjust weight values of one or more kernels included in the first convolutional neural network to reduce a difference between the first feature information and the second feature information.

8. The image processing apparatus of claim 6, wherein the processor is further configured to calculate a first difference between the first feature information and the second feature information and a second difference between third feature information corresponding to the flickering-removed high-resolution image of the previous frame and fourth feature information corresponding to an actual high-resolution image of the previous frame, and adjust weight values of one or more kernels included in the second convolutional neural network to reduce a difference between the first difference and the second difference.

9. The image processing apparatus of claim 1, wherein the memory stores the second high-resolution image.

10. An operation method of an image processing apparatus for generating a high-resolution moving image, the operation method comprising:

extracting feature information regarding a low-resolution image of a current frame by using a first convolutional neural network;

generating, based on the feature information, a first high-resolution image of the current frame;

removing flickering of the first high-resolution image to generated a second high-resolution image of the current frame, by using a flickering-removed high-resolution image of a previous frame, whereby the second high-resolution image is a flickering-removed high-resolution image of the current frame; and removing flickering of a high-resolution image of a next frame generated from a low-resolution image of the next frame, by using the second high-resolution image of the current frame.

11. The operation method of claim 10, wherein the extracting of the feature information comprises extracting the feature information by inputting the low-resolution image of the current frame to the first convolutional neural network and performing a convolution operation with one or more kernels in each convolution layer of the first convolutional neural network.

12. The operation method of claim 10, wherein the generating of the first high-resolution image comprises generating the first high-resolution image by applying, to the feature information, at least one of a bilinear interpolation method, a bicubic interpolation method, or a convolutional interpolation method.

13. The operation method of claim 10, wherein the removing of flickering of the first high-resolution image comprises removing flickering of the first high-resolution image by inputting the first high-resolution image of the current frame and the flickering-removed high-resolution image of the previous frame to a second convolutional neural network and performing a convolution operation with one or more kernels in each convolution layer of the second convolutional neural network.

14. The operation method of claim 13, further comprising:

extracting first feature information corresponding to the second high-resolution image and second feature information corresponding to the actual high-resolution image of the current frame; and updating, based on the first feature information and the second feature information, at least one of the first convolutional neural network or the second convolutional neural network.

* * * * *